US012604345B2

(12) United States Patent
Kuo et al.

(10) Patent No.:  US 12,604,345 B2
(45) Date of Patent:  Apr. 14, 2026

(54) USER EQUIPMENT CONFIGURATION FOR DETERMINING CHANNEL ACCESS PRIORITY CLASS

(71) Applicant: Apple Inc., Cupertino, CA (US)

(72) Inventors: Ping-Heng Kuo, London (GB); Pavan Nuggehalli, San Carlos, CA (US); Ralf Rossbach, Munich (DE)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 18/334,470

(22) Filed: Jun. 14, 2023

(65) Prior Publication Data

US 2023/0413346 A1      Dec. 21, 2023

Related U.S. Application Data

(60) Provisional application No. 63/366,413, filed on Jun. 15, 2022.

(51) Int. Cl.
| | |
|---|---|
| *H04W 74/08* | (2024.01) |
| *H04W 28/02* | (2009.01) |
| *H04W 74/0808* | (2024.01) |
| *H04W 76/10* | (2018.01) |

(52) U.S. Cl.
CPC ...  *H04W 74/0875* (2013.01); *H04W 28/0268* (2013.01); *H04W 74/0808* (2013.01); *H04W 76/10* (2018.02)

(58) Field of Classification Search
CPC ......... H04W 28/0268; H04W 74/0808; H04W 74/0875; H04W 76/10
See application file for complete search history.

(56) References Cited

U.S. PATENT DOCUMENTS

| | | | | |
|---|---|---|---|---|
| 2020/0100285 | A1* | 3/2020 | Roy | H04W 74/0808 |
| 2020/0359411 | A1* | 11/2020 | Li | H04W 16/14 |
| 2021/0051572 | A1* | 2/2021 | Roy | H04L 5/0094 |
| 2021/0058819 | A1* | 2/2021 | Ozturk | H04W 72/56 |
| 2022/0183049 | A1* | 6/2022 | Lee | H04W 72/569 |
| 2022/0217722 | A1* | 7/2022 | Wang | H04W 74/0808 |
| 2023/0308935 | A1* | 9/2023 | Chen | H04W 28/0268 |
| 2024/0276549 | A1* | 8/2024 | Freda | H04W 72/40 |
| 2024/0373435 | A1* | 11/2024 | Thomas | G01S 5/0236 |
| 2025/0176038 | A1* | 5/2025 | Löhr | H04W 72/569 |

* cited by examiner

*Primary Examiner* — Melanie Jagannathan
(74) *Attorney, Agent, or Firm* — Fay Kaplun & Marcin, LLP

(57) ABSTRACT

A user equipment (UE) is configured to receive, from a base station, a configuration establishing a radio bearer for sending at least one measurement report related to at least one application layer measurement, perform the at least one application layer measurement, determine a first channel access priority class (CAPC) for the radio bearer based on at least one rule, select a second CAPC for a transport block to be used to send the at least one measurement report based on the first CAPC for the radio bearer and send the at least one measurement report using the transport block based on the second CAPC for the transport block.

20 Claims, 4 Drawing Sheets

Base Station 300

USER EQUIPMENT CONFIGURATION FOR DETERMINING CHANNEL ACCESS PRIORITY CLASS

BACKGROUND

In new radio (NR) operation in an unlicensed band, each radio bearer is associated with a channel access priority class (CAPC) parameter that is applied to a listen-before-talk (LBT) access procedure. A higher priority CAPC allows for more aggressive LBT behavior that should result in faster access to the transmission medium.

NR also includes a new Quality of Experience (QoE) reporting mechanism that allows the network to collect application layer measurement results from a user equipment (UE) for Operation, Administration and Maintenance (OAM) or radio access network (RAN) optimization purposes. A new type of signaling radio bearer (SRB4) has been defined for QoE reporting by the UE in uplink. However, there is no definition of the CAPC for QoE measurement reporting in the unlicensed band.

SUMMARY

Some exemplary embodiments are related to an apparatus of a user equipment (UE), the apparatus including processing circuitry configured to decode, from signaling received from a base station, a configuration establishing a radio bearer for sending at least one measurement report related to at least one application layer measurement, perform the at least one application layer measurement, determine a first channel access priority class (CAPC) for the radio bearer based on at least one rule, select a second CAPC for a transport block to be used to send the at least one measurement report based on the first CAPC for the radio bearer and configure transceiver circuitry to send the at least one measurement report using the transport block based on the second CAPC for the transport block.

Other exemplary embodiments are related to an apparatus of a base station, the apparatus including processing circuitry configured to configure transceiver circuitry to send, to a user equipment (UE), a configuration establishing a radio bearer for sending at least one measurement report related to at least one application layer measurement performed by the UE, configure transceiver circuitry to send, to the UE, at least one rule for determining a channel access priority class (CAPC) for the radio bearer and decode, from signaling received from the UE, at least one measurement report corresponding to the at least one application layer measurement in a transport block.

DETAILED DESCRIPTION

Figure 1:
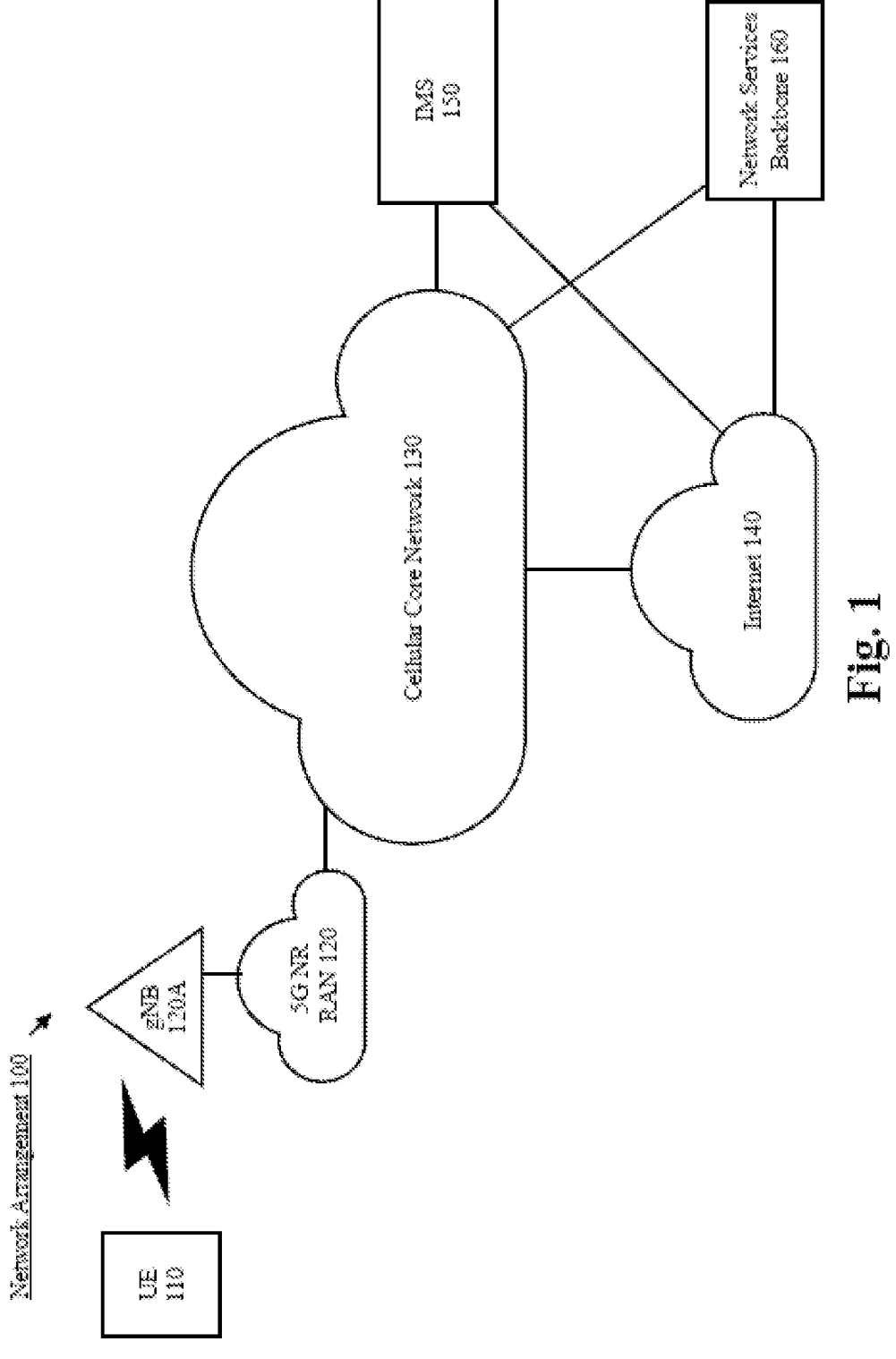
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments introduce exemplary techniques for a user equipment (UE) to report quality of experience (QoE) measurements to a base station of a network in the unlicensed band.

The exemplary embodiments are described with regard to a UE. Those skilled in the art will understand that the UE may be any type of electronic component that is configured to communicate via a network, e.g., mobile phones, tablet computers, desktop computers, smartphones, phablets, embedded devices, wearables, Internet of Things (IoT) devices, etc. Therefore, the UE as described herein is used to represent any electronic component that directly communicates with the network and presents content to the user. In other configurations, the UE may be a wearable device that communicates directly with the network and presents content to the user. Therefore, the UE as described herein is used to represent any electronic component that directly communicates with the network.

As described above, in 5G NR, channel access in the downlink and the uplink relies on a listen-before-talk (LBT) feature for operation in an unlicensed band. For 5G NR operation in the unlicensed band, each radio bearer is associated with a parameter such as the channel access priority (CAPC) that corresponds to a set of parameters that are applied for the LBT operation. The UE can only complete a signal transmission in an unlicensed band after a LBT operation has successfully taken place.

As defined in the 3GPP Standard 38.300, when performing Type 1 LBT for the transmission of an uplink transport block (TB) and the CAPC is not indicated in the DCI, the UE shall select the CAPC for the TB as follows: (1) If only Medium Access Control Control Elements (MAC CE(s)) are included in the TB, the highest priority CAPC of those MAC CE(s) is used; or (2) If Common Control Channel (CCCH) Service Data Units (SDU(s)) are included in the TB, the highest priority CAPC is used; or (3) If Dedicated Control Channel (DCCH) SDU(s) are included in the TB, the highest priority CAPC of the DCCH(s) is used; or (4) The lowest priority CAPC of the logical channel(s) with MAC SDU multiplexed in the TB is used otherwise. Since there is no CAPC defined for the SRB4, the UE behavior may become ambiguous when applying these rules to select the CAPC for the TB conveying SRB4. For example, it is noted that SRB4 is carried by DCCH (according to TS 38.331) and thus rule (3) described previously should be applied for a TB carrying SRB4. However, the rule requires the UE to choose the highest priority CAPC of the DCCH(s), and it is not clear how the UE should select the CAPC when the DCCH corresponds to SRB4 whose CAPC is not defined in the standard. The exemplary embodiments are related to defining CAPC rules specific to QoE reporting on SRB4 for the UE, such that the UE can properly implement the generic rules defined by the standard to select the CAPC for a TB conveying QoE reports on SRB4. While the exemplary embodiments are described with reference to using SRB4 for reporting QoE measurements, it should be understood that other radio bearers may be used. For example, in Rel-18 of the 3GPP standards, SRB5 may be used for QoE reporting, e.g., when the UE intends to report QoE to a secondary node in dual-connectivity scenarios.

QoE describes metrics that measure the performance of an application from the perspective of a user. These metrics may be quantified by performing application layer measurements. The QoE measurement reporting allows the UE to report application layer measurements for service types such as VR/AR/MR, multicast, broadcast, streaming, etc. However, it should be understood that the exemplary embodiments are not limited to any particular QoE measurement and may be used for any type of QoE measurements that are performed by a UE and corresponding measurement reports that are sent by the UE to the network.

The QoE measurement reporting may be referred to as QoE measurement reports and include the results of the QoE measurements (e.g., application layer measurement reporting) performed by the UE. As also stated above, in some instances, these QoE measurement reports may be transmitted in the unlicensed band. In the exemplary embodiments, the radio bearer that is established for the UE to send the QoE measurement reports in the unlicensed band may be SRB4. Thus, the UE will perform the LBT access procedure for QoE measurement reporting based on the CAPC of the SRB4. However, as stated above, there is presently no CAPC defined for SRB4. Thus, when the UE is operating in an unlicensed band and network configures the UE to send QoE measurement reports, the UE will need to understand the CAPC for the SRB4 to properly apply the CAPC selection rules defined in standard and transmit the QoE measurement reports. It should be understood that while the exemplary embodiments are described with reference to SRB4 being used for sending the QoE measurement reports, the principles described herein may be applied to any radio bearer that is used to send the QoE measurement reports.

The QoE measurement reports that are sent from the UE to the network may be sent in various manners. In some exemplary embodiments, the UE may send the QoE measurement reports via other signaling mechanisms, e.g., Radio Resource Control (RRC) signaling, Medium Access Control (MAC) signaling, etc. Thus, throughout this description, when it is described that the UE sends a QoE measurement report to the network, it should be understood that the reporting mechanism may include the examples provided above or any other reporting mechanism that allows the UE to send a QoE measurement report to the network.

The exemplary embodiments relate to defining rules that allow the UE to determine the CAPC for the SRB4 that is used to send the QoE measurement reports in the unlicensed band. These rules may be described as CAPC rules that may be predefined (e.g., by standards documents such as the 3GPP Specifications) or may be transmitted by the network to the UE. Each of these exemplary embodiments will be described in greater detail below. The exemplary QoE measurement reporting techniques described herein may be used in conjunction with currently implemented QoE measurement reporting techniques, other QoE measurement reporting techniques or independently from other QoE measurement reporting techniques.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., gNB 120A). However, as mentioned above, reference to the 5G NR-RAN 120 is merely for illustrative purposes and any appropriate type of RAN may be used.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
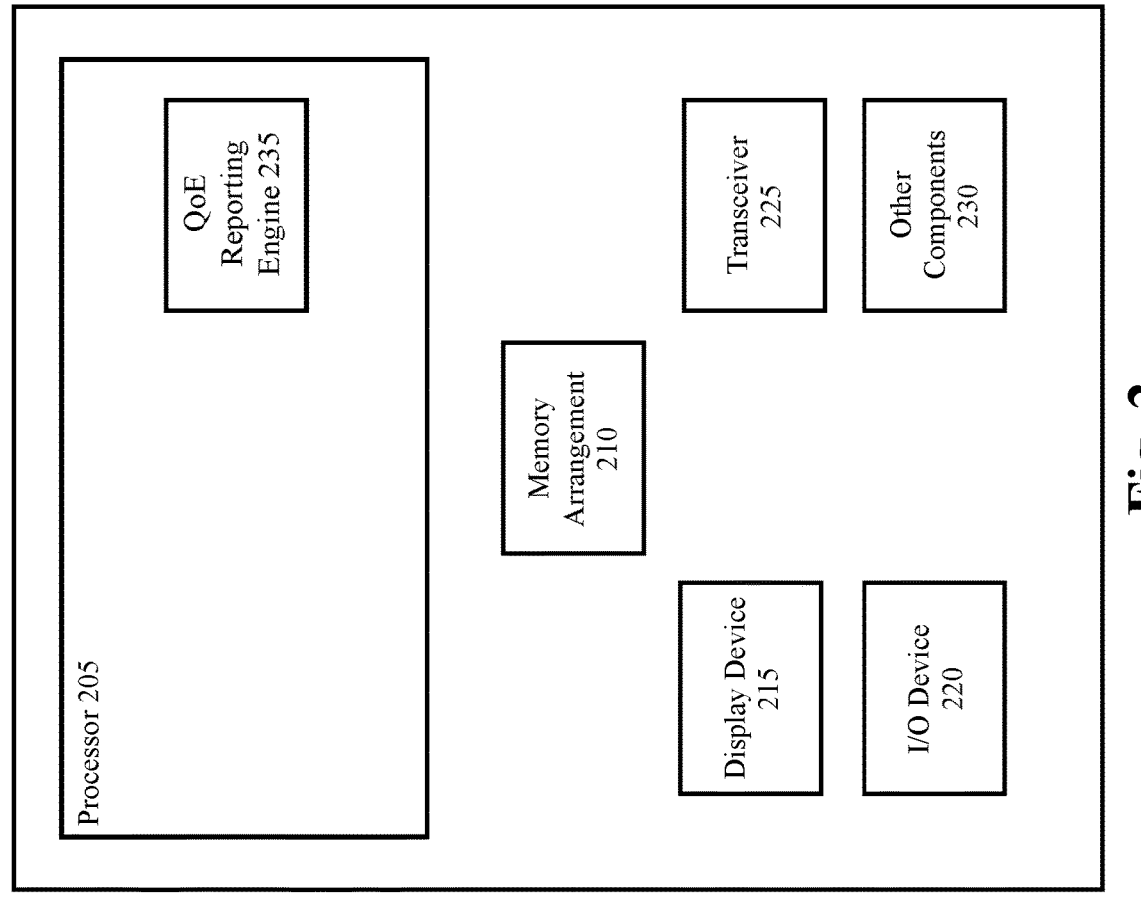
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a QoE reporting engine 235. The QoE reporting engine 235 may perform various operations related to the exemplary QoE measurements reporting described herein. These operations may include, but are not limited to, performing QoE measurements for the UE, determining the CAPC for SRB4 and sending the QoE measurement reports to the network based on the CAPC. Each of these various operations will be described in greater detail below.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies). The transceiver 225 includes circuitry configured to transmit and/or receive signals (e.g., control signals, data signals). Such signals may be encoded with information implementing any one of the methods described herein. The processor 205 may be operably coupled to the transceiver 225 and configured to receive from and/or transmit signals to the transceiver 225. The processor 205 may be configured to encode and/or decode signals (e.g., signaling from a base station of a network) for implementing any one of the methods described herein.

Figure 3:
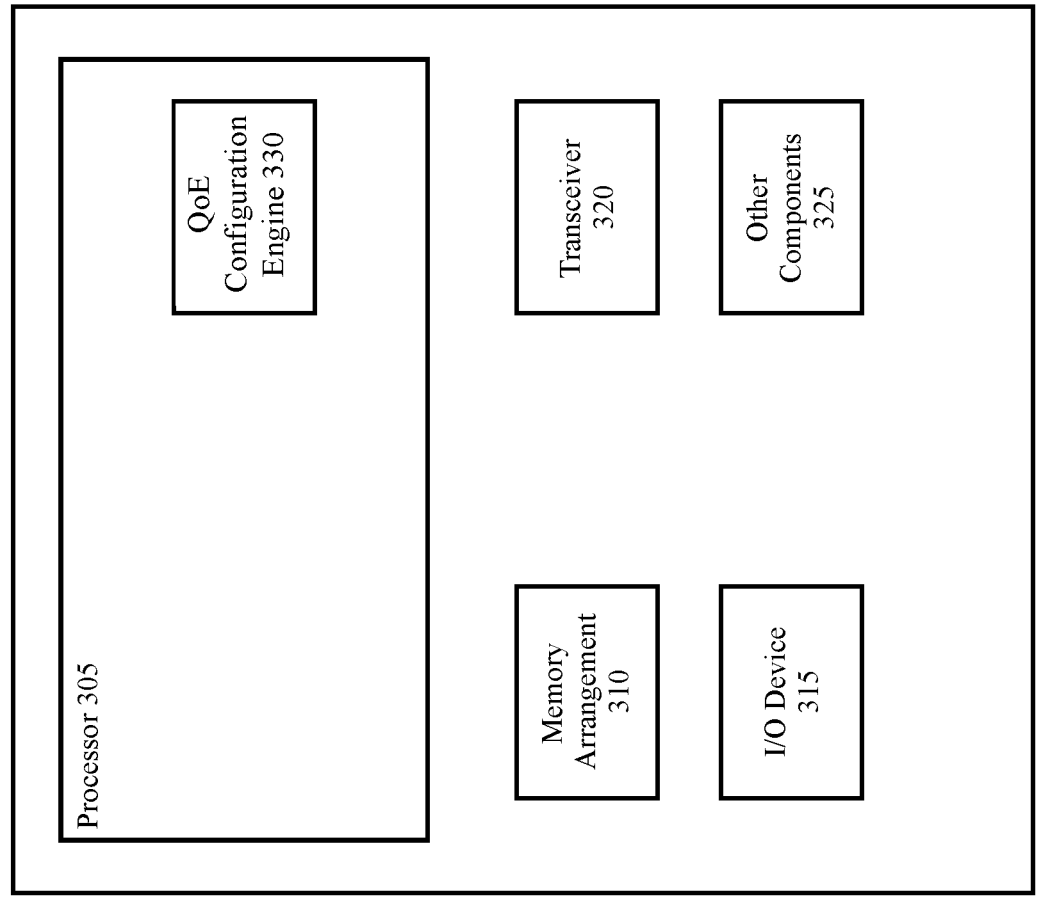
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a QoE configuration engine 330. The QoE configuration engine 330 may perform various operations related to the exemplary QoE measurement reporting configuration described herein. The operations may include but are not limited to, configuring the SRB4 between the UE 110 and the base station 300 for QoE measurement reporting and configuring the UE with the CAPC rules for the SRB4. Each of these various operations will be described in greater detail below.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs. The transceiver 320 includes circuitry configured to transmit and/or receive signals (e.g., control signals, data signals). Such signals may be encoded with information implementing any one of the methods described herein. The processor 305 may be operably coupled to the transceiver 320 and configured to receive from and/or transmit signals to the transceiver 320. The processor 305 may be configured to encode and/or decode signals (e.g., signaling from a UE) for implementing any one of the methods described herein.

As described above, the exemplary embodiments are related to the UE 110 determining a CAPC for the SRB4 to send QoE measurement reports in the unlicensed band. The following will provide examples of different types of CAPC rules that the UE 110 may apply to determine the CAPC for the SRB4 used to send the QoE measurement reports to the gNB 120A. As also described above, the CAPC rules that may be preconfigured (or predefined) for the UE 110 or may be sent by the network (e.g., gNB 120A) as part of a configuration between the UE 110 and the gNB 120A.

Figure 4:
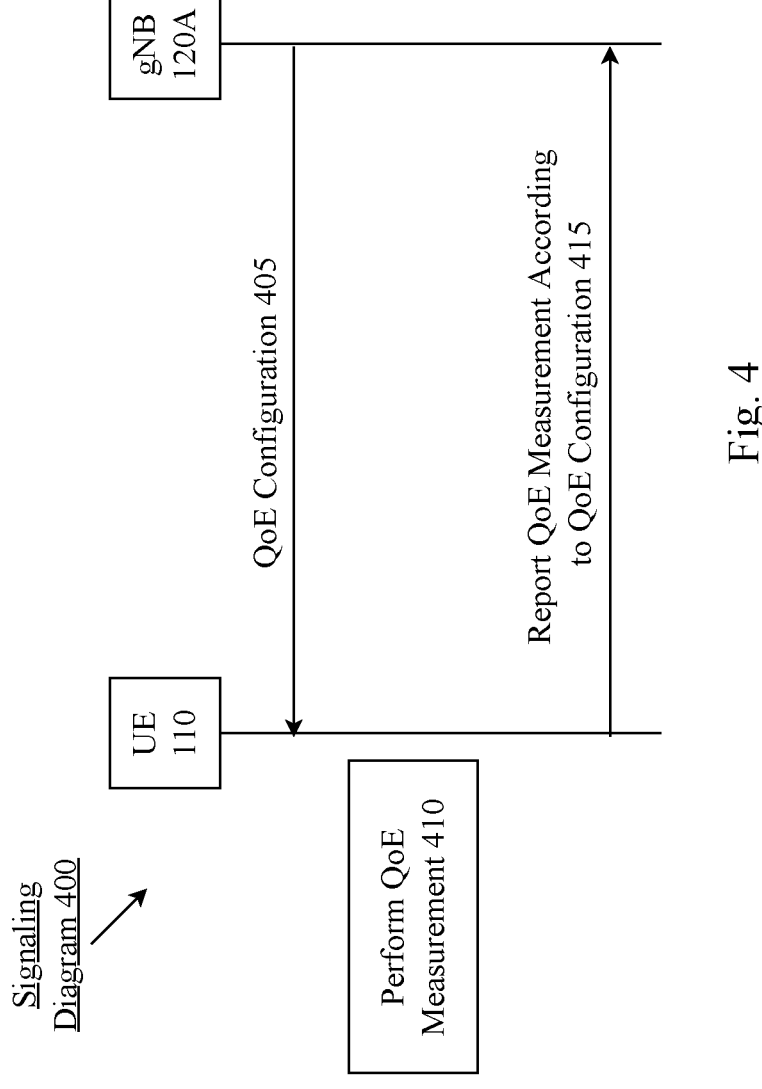
FIG. 4 shows a signaling diagram for quality of experience (QoE) measurements reporting according to various exemplary embodiments.

Prior to providing the examples of the CAPC rules, a general overview of the QoE configuration and QoE measurement reporting will be provided. FIG. 4 shows a signaling diagram 400 of QoE measurement reporting for SRB4 according to various exemplary embodiments. The signaling diagram 400 provides an overview of QoE measurement reporting process. The signaling diagram 400 is described with regard to the network arrangement 100 of FIG. 1, the UE 110 of FIG. 2 and the base station 300 (e.g., gNB 120A) of FIG. 3.

In 405, the UE 110 receives a QoE configuration from the gNB 120A. The QoE configuration may be used to establish an SRB (e.g., SRB4) between the UE 110 and the gNB 120A for QoE measurement reporting. The procedure for establishing the SRB4 is not shown in FIG. 4 as it is a known procedure. In addition, the QoE configuration may include the type and frequency of QoE measurements that the UE 110 is to perform. It should be understood that the QoE configuration may include multiple QoE configurations that may be received at a single time or may be received at various times during the operation of the UE 110. For example, the UE 110 may be executing a plurality of applications. The network may send the UE 110 one or more QoE configurations for each of these applications. As will be described in greater detail below, the CAPC rules may be applied across all the currently operating QoE configurations of the UE 110.

In some exemplary embodiments, the QoE configuration may also include the CAPC rules for determining the CAPC for the SRB4. In some embodiments, the QoE configuration may be provided to the UE 110 in one or more RRC messages. In other embodiments, the QoE configuration may be provided to the UE 110 in one or more MAC control elements (MAC-CEs). However, the exemplary embodiments are not limited to RRC messages or MAC-CEs, the QoE configuration information may be provided to the UE 110 in any appropriate manner.

In 410, the UE 110 performs QoE measurements based on the QoE configuration received in 405. In 415, the UE 110 sends the QoE measurement reports to the gNB 120A in the unlicensed band based on the CAPC determined for the SRB4. As described above, the exemplary embodiments allow the UE 110 to determine the CAPC of the SRB4 configured for sending the QoE measurement reports.

The exemplary embodiments introduce manners for the UE 110 to determine the CAPC for QoE measurement reporting using the SRB4 in the unlicensed band. The exemplary embodiments provide CAPC rules implemented by the UE 110 to determine the CAPC for the SRB4 to allow the UE 110 to perform LBT when sending the QoE measurement reports. The following provides examples of CAPC rules that may be implemented by the UE 110. It should be understood that the examples are not an exhaustive list of all the CAPC rules that may be implemented by the UE 110 but are merely provided to show various examples of CAPC rules. It should also be understood that the example rules are not mutually exclusive and more than one of the CAPC rules may be implemented by the UE 110.

In some exemplary embodiments, the CAPC rule is that the CAPC for the SRB4 is assigned the highest value, i.e., CAPC=1. As described above, this CAPC rule may be defined by standard (e.g., 3GPP standards) such that the UE 110 is aware of the rule for reporting QoE measurements on the SRB4. Thus, in these exemplary embodiments, when the gNB 120A configures the UE 110 to perform QoE measurements and send the QoE measurement reports in the unlicensed band on the SRB4, the UE 110 will perform the most aggressive LBT operations based on the CAPC of the SRB4 having the highest priority.

In other exemplary embodiments, the CAPC rule is that the CAPC for the SRB4 is assigned the lowest value, i.e., CAPC=4. Thus, in these exemplary embodiments, when the gNB 120A configures the UE 110 to perform QoE measurements and send the QoE measurement reports in the unlicensed band on the SRB4, the UE 110 will perform the least aggressive LBT operations based on the CAPC of the SRB4 having the lowest priority. It should be understood that the above two examples defined the CAPC as either the highest priority or the lowest priority. However, in other exemplary embodiments, the CAPC rules may define the CAPC for the SRB4 as any of the intermediate priority levels between the highest priority and the lowest priority.

In some exemplary embodiments, the CAPC rule may be sent by the gNB 120A to the UE 110 as part of the logical channel configuration for SRB4, e.g., as part of RRC signaling, MAC-CE signaling, etc. For example, it can be configured using the field of channelAccessPriority in the information element (IE) of logicalChannelConfig for SRB4, and the UE 110 may be configured to assign the CAPC to a certain value (e.g., CAPC=X, where X could be any value between 1 to 4, with 4 being the lowest and 1 being the highest). Accordingly, in these exemplary embodiments, the network configures the UE 110 to determine the CAPC of the SRB4 to send the QoE measurement reports. Based on the configuration, the UE 110 performs the QoE measurements and then sends the QoE measurement reports using the SRB4 in the unlicensed band based on the CAPC configured by the gNB 120A for the UE 110.

In further exemplary embodiments, the CAPC rules may be sent by the gNB 120A to the UE 110 as part of the QoE configuration, e.g., as part of RRC signaling, MAC-CE signaling, etc. For example, as part of the QoE configuration, the UE 110 may receive CAPC rules that configure the UE 110 to assign the CAPC for the SRB4 to a specific priority. For example, the UE 110 may be configured to assign the CAPC to a certain value (e.g., CAPC=X, where X could be any value between 1 to 4, with 4 being the lowest and 1 being the highest). Accordingly, in these exemplary embodiments, the network configures the UE 110 to determine the CAPC of the SRB4 to send the QoE measurement reports. Based on the configuration, the UE 110 performs the QoE measurements and then sends the QoE measurement reports using the SRB4 in the unlicensed band based on the CAPC configured by the gNB 120A for the UE 110.

It should be understood that the gNB 120A may configure the UE 110 with the CAPC rules in other types of messages that are unrelated to the QoE configuration. For example, the CAPC priority may be broadcast by the gNB 120A in a system information block (SIB) such that any UE connecting to the gNB 120A understands the CAPC rules for SRB4. In another example, the gNB 120A may send the CAPC rules to the UE 110 as part of a configuration during a general connection procedure or a specific connection procedure related to the unlicensed band. Thus, in this example, different UEs that are connected to the gNB 120A may have different CAPC rules. In another aspect, the gNB may transmit the QoE configuration to the UE 110 without preconfiguring the CAPC for the SRB4 in the configuration. Thus, the UE 110 may implement a fallback option by utilizing previously configured CAPC rules to report the QoE measurements on SRB4. Alternatively, the UE 110 may use a fixed default CAPC for SRB4 when the configuration by the gNB 120A is absent.

In additional exemplary embodiments, the CAPC rules for determining the CAPC for the SRB4 may be based on the contents of the message conveyed using the SRB4. As described above, the contents of the message includes the QoE measurement reports. However, the specific information that is included in each QoE measurement report is dependent on the QoE configuration, e.g., the specific application layer measurements the UE 110 is configured to perform. The CAPC rules may be applied to the contents of the QoE measurement reports to determine the CAPC for sending the QoE measurement reports.

In a first example, the UE 110 is configured to determine the CAPC of the SRB4 based on the service type, priority level, or the ID of the application measurement configuration. Those skilled in the art will understand that each application measurement configuration may have an application ID that is defined in NR networks using the measConfigAppLayerId Information Element (IE), a priority level, and/or a service type for the application that is defined by the serviceType IE. The gNB 120A may preconfigure the UE 110 to determine the CAPC for SRB4 based on the specific value of the measConfigAppLayerId, the serviceType or the priority level of the application measurement configuration for which application layer measurements are being performed. That is, based on the service type, priority, or ID of the application measurement configuration, the gNB 120A may preconfigure the CAPC in finer granularity to generate a CAPC specific to the application measurement configuration or service type. Thus, based on the QoE configuration, the UE 110 performs the QoE measurements and sends the QoE measurement reports based on the CAPC determined by the UE 110 using the CAPC rules.

In a second example, the CAPC rules for determining the CAPC may be based on a type of application layer measurement reports. In this example, there may be two types of application layer measurement reports, a radio access network (RAN)-visible QoE measurement report and non-RAN visible measurement report. For example, if the SRB4 message conveys a RAN-visible QoE measurement report, the CAPC rules may configure the UE 110 to assign the highest CAPC for the SRB4 based on the type of QoE measurement report. In another example, if the SRB4 message conveys regular reports such as non-RAN visible QoE measurement report, the CAPC rules may configure the UE 110 to assign the lowest CAPC for the SRB4 based on the type of QoE report. Thus, based on the QoE configuration, the UE 110 performs the QoE measurements and sends the QoE measurement reports based on the CAPC determined by the UE 110 using the CAPC rules.

In a third example, the UE 110 may have knowledge about the 5G QoS Identifier (5QI), PC5 5QI (PQI) or PDU Session IDs associated with data content that is mapped to a radio bearer for communication services of a particular application. Based on the knowledge, the UE 110 may determine the CAPC of the SRB4 based on the quality of service (QoS) flows of the application that is measured for the QoE reporting on the SRB4. For example, if multiple reports of different application measurement configurations are conveyed in a single message, such as one configuration for VR, one for multicast or broadcast, etc., then the UE 110 may be configured to select a CAPC for the message based on the highest priority among the applications associated with the SRB4 message. In another example, if the communication service for the application is associated with a QoS flow mapped to a lower CAPC, the UE 110 may be configured to assign a lower priority CAPC to the SRB4.

It should be understood that the UE 110 may be configured with multiple different application measurement configurations. When this occurs, the UE 110 may determine the CAPC for the different application measurement configurations and select the CAPC for SRB4 based on the lowest or highest CAPC among the application measurement configurations whose reports will be included in the measurement reports. In addition, it should be understood that the above CAPC rules may be used individually or in combination with other CAPC rules, including the example CAPC rules described herein or other CAPC rules.

In still further exemplary embodiments, the UE 110 determines the CAPC for the SRB4 based on a number of entries in an application layer buffer level list. The UE 110 may be configured to report a list of buffer level observed for certain applications received by the UE 110. Thus, the UE 110 may determine compare the number of entries to a predefined threshold. Thus, in one aspect, if the number of entries exceeds the threshold, the UE 110 may assign a higher CAPC. In another aspect, if the number of entries is below the threshold, the UE 110 may assign a lower CAPC. The UE 110 performs the QoE measurements based on the QoE configuration and sends the QoE measurement reports based on the CAPC determined by the UE 110 according the CAPC rules related to the number of entries in the application layer buffer level list.

In some exemplary embodiments, the UE 110 determines the CAPC for the transport block (TB) conveying the SRB4 message based on the other logical channels that are multiplexed together in the same TB. For example, when SRB4 is multiplexed with SRB2 in the same TB, the UE 110 may simply use the CAPC configured for SRB2, or always use the highest possible CAPC (CAPC value=1), or always use the lowest possible CAPC (CAPC value=4). In another example, when SRB4 is multiplexed with at least one data radio bearer (DRB) in the same TB, the UE 110 may simply use the CAPC configured for DRB, or always use the highest possible CAPC (CAPC value=1), or always use the lowest possible CAPC (CAPC value=4).

EXAMPLES

In a first example, a method is performed by a user equipment (UE), comprising: receiving, from a base station, a configuration establishing a radio bearer for sending at least one measurement report related to at least one application layer measurement, performing the at least one application layer measurement, determining a first channel access priority class (CAPC) for the radio bearer based on at least one rule, selecting a second CAPC for a transport block to be used to send the at least one measurement report based on the first CAPC for the radio bearer and sending the at least one measurement report using the transport block based on the second CAPC for the transport block.

In a second example, the method of the first example, wherein the at least one rule comprises assigning one of a plurality of predefined priority CAPC values for the first CAPC for the radio bearer.

In a third example, the method of the second example, wherein the predefined priority value comprises a highest priority CAPC value for the radio bearer.

In a fourth example, the method of the second example, wherein the predefined priority value comprises a lowest priority CAPC value for the radio bearer.

In a fifth example, the method of the first example, further comprising receiving, from the base station, the at least one rule.

In a sixth example, the method of the first example, wherein the first CAPC determination is further based on at least one field of an information element for configuration of a logical channel corresponding to the radio bearer.

In a seventh example, the method of the sixth example, wherein the at least one field indicates a CAPC value for the radio bearer.

In an eighth example, the method of the first example, wherein the determining the CAPC is further based on information included in the at least one measurement report or related to the at least one measurement report.

In a ninth example, the method of the eighth example, wherein the information comprises an application measurement configuration identification corresponding to the at least one application layer measurement or an application service type corresponding to the at least one application layer measurement.

In a tenth example, the method of the eighth example, wherein the information comprises whether the measurement report is a radio access network (RAN)-visible report.

In an eleventh example, the method of the tenth example, wherein a RAN-visible report is assigned a higher CAPC than a measurement report not including a RAN-visible report.

In a twelfth example, the method of the eighth example, wherein the information relates to quality of service (QoS) of a communication service for an application corresponding to the at least one application layer measurement.

In a thirteenth example, the method of the first example, wherein the first CAPC determination is further based on a number of entries in an application layer buffer level list.

In a fourteenth example, the method of the thirteenth example, wherein the number of entries in the application layer buffer level list is compared to a predefined threshold and the CAPC rule comprises assigning a higher priority CAPC when the number of entries in the application layer buffer level list exceeds the threshold as compared to when the number of entries in the application layer buffer level list does not exceed the threshold.

In a fifteenth example, the method of the first example, wherein the determining the CAPC is further based on at least one other logical channel multiplexed with the radio bearer in the transport block.

In a sixteenth example, the method of the first example, wherein the at least one application layer measurement is a Quality of Experience (QoE) measurement.

In a seventeenth example, the method of the first example, wherein first CAPC and the second CAPC is one of a same value or a different value.

In an eighteenth example, a processor of a user equipment configured to perform any of the methods of the first through seventeenth examples.

In a nineteenth example, a user equipment comprising a transceiver configured to communicate with a network and a processor communicatively coupled to the transceiver and configured to perform any of the methods of the first through seventeenth examples.

In a twentieth example, a method performed by a base station, comprising: sending, to a user equipment (UE), a configuration establishing a radio bearer for sending at least one measurement report related to at least one application layer measurement performed by the UE, sending, to the UE, at least one rule for determining a channel access priority class (CAPC) for the radio bearer and receiving, from the UE, at least one measurement report corresponding to the at least one application layer measurement in a transport block.

In a twenty first example, the method of the twentieth example, wherein the configuration and the at least one rule is included in a same message sent from the base station to the UE.

In a twenty second example, the method of the twentieth example, wherein the at least one rule for determining a CAPC for the radio bearer is based on at least one field of an information element for configuration of a logical channel corresponding to the radio bearer.

In a twenty third example, the method of the twentieth example, wherein the at least one rule comprises assigning one of a plurality of predefined priority CAPC values for the radio bearer.

In a twenty fourth example, the method of the twenty third example, wherein the predefined priority CAPC value comprises a highest priority CAPC value for the radio bearer.

In a twenty fifth example, the method of the twenty third example, wherein the predefined priority CAPC value comprises a lowest priority CAPC value for the radio bearer.

In a twenty sixth example, the method of the twentieth example, wherein the at least one rule relates to an application measurement configuration identification corresponding to the at least one application layer measurement or an application service type corresponding to the at least one application layer measurement.

In a twenty seventh example, the method of the twentieth example, wherein the at least one rule relates to whether the measurement report is a radio access network (RAN)-visible report.

In a twenty eighth example, the method of the twenty seventh example, wherein a RAN-visible report is assigned a higher CAPC than a measurement report not including a RAN-visible report.

In a twenty ninth example, the method of the twentieth example, wherein the at least one rule relates to quality of service (QoS) of a communication service for an application corresponding to the at least one application layer measurement.

In a thirtieth example, the method of the twentieth example, wherein the at least one rule relates to a number of entries in an application layer buffer level list.

In a thirty first example, the method of the twentieth example, wherein the at least one rule relates to at least one other logical channel multiplexed with the radio bearer in the transport block.

In a thirty second example, the method of the twentieth example, wherein the at least one application layer measurement is a Quality of Experience (QoE) measurement.

In an thirty third example, a processor of a base station configured to perform any of the methods of the twentieth through thirty second examples.

In a thirty fourth example, a base station comprising a transceiver configured to communicate with a user equipment (UE) and a processor communicatively coupled to the transceiver and configured to perform any of the methods of the twentieth through thirty second examples.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. An apparatus of a user equipment (UE), the apparatus comprising processing circuitry configured to:
decode, from signaling received from a base station, a configuration establishing a radio bearer for sending at least one measurement report related to at least one application layer measurement, wherein the at least one application layer measurement includes a Quality of Experience (QoE) measurement;
perform the at least one application layer measurement;
determine a first channel access priority class (CAPC) for the radio bearer based on at least one rule;
select a second CAPC for a transport block to be used to send the at least one measurement report based on the first CAPC for the radio bearer; and
configure transceiver circuitry to send the at least one measurement report using the transport block based on the second CAPC for the transport block.

2. The apparatus of claim 1, wherein the at least one rule comprises assigning one of a plurality of predefined priority CAPC values for the first CAPC for the radio bearer.

3. The apparatus of claim 2, wherein the predefined priority value comprises a highest priority CAPC value for the radio bearer.

4. The apparatus of claim 2, wherein the predefined priority value comprises a lowest priority CAPC value for the radio bearer.

5. The apparatus of claim 1, further comprising processing circuitry configured to:
decode, from signaling received from the base station, the at least one rule.

6. The apparatus of claim 1, wherein the first CAPC determination is further based on at least one field of an information element for configuration of a logical channel corresponding to the radio bearer.

7. The apparatus of claim 6, wherein the at least one field indicates a CAPC value for the radio bearer.

8. The apparatus of claim 1, wherein the determining the CAPC is further based on information included in the at least one measurement report or related to the at least one measurement report.

9. The apparatus of claim 8, wherein the information comprises an application measurement configuration identification corresponding to the at least one application layer measurement or an application service type corresponding to the at least one application layer measurement.

10. The apparatus of claim 8, wherein the information comprises whether the measurement report is a radio access network (RAN)-visible report.

11. The apparatus of claim 10, wherein a RAN-visible report is assigned a higher CAPC than a measurement report not including a RAN-visible report.

12. The apparatus of claim 8, wherein the information relates to quality of service (QoS) of a communication service for an application corresponding to the at least one application layer measurement.

13. The apparatus of claim 1, wherein the first CAPC determination is further based on a number of entries in an application layer buffer level list.

14. The apparatus of claim 13, wherein the number of entries in the application layer buffer level list is compared to a predefined threshold and the CAPC rule comprises assigning a higher priority CAPC when the number of entries in the application layer buffer level list exceeds the threshold as compared to when the number of entries in the application layer buffer level list does not exceed the threshold.

15. The apparatus of claim 1, wherein the determining the CAPC is further based on at least one other logical channel multiplexed with the radio bearer in the transport block.

16. The apparatus of claim 1, wherein first CAPC and the second CAPC is one of a same value or a different value.

17. An apparatus of a base station, the apparatus comprising processing circuitry configured to:
configure transceiver circuitry to send, to a user equipment (UE), a configuration establishing a radio bearer for sending at least one measurement report related to at least one application layer measurement performed by the UE, wherein the at least one application layer measurement includes a Quality of Experience (QoE) measurement;
configure transceiver circuitry to send, to the UE, at least one rule for determining a channel access priority class (CAPC) for the radio bearer; and
decode, from signaling received from the UE, at least one measurement report corresponding to the at least one application layer measurement in a transport block.

18. The apparatus of claim 17, wherein the configuration and the at least one rule is included in a same message sent from the base station to the UE.

19. The apparatus of claim 17, wherein the at least one rule for determining a CAPC for the radio bearer is based on at least one field of an information element for configuration of a logical channel corresponding to the radio bearer.

20. The apparatus of claim 19, wherein the at least one field indicates a CAPC value for the radio bearer.

* * * * *